United States Patent [19]
Fujisaka et al.

[11] Patent Number: 6,081,220
[45] Date of Patent: Jun. 27, 2000

[54] RADAR SYSTEM FOR OBSERVING WEATHER PHENOMENA WITH IMPROVED RADAR SYSTEM PARAMETERS

[75] Inventors: Takahiko Fujisaka; Toshio Wakayama; Ryuzaburo Usui, all of Tokyo, Japan

[73] Assignee: Mitsubishi Denki Kabushiki Kaisha, Tokyo, Japan

[21] Appl. No.: 09/023,212

[22] Filed: Feb. 13, 1998

[30] Foreign Application Priority Data

Feb. 13, 1997 [JP] Japan ................................. 9-028815

[51] Int. Cl.$^7$ ...................................................... G01S 13/95
[52] U.S. Cl. .................................. 342/26; 702/3; 706/931
[58] Field of Search ......................... 342/26; 73/170.16, 73/170.17; 455/505; 702/3; 706/931

[56] References Cited

U.S. PATENT DOCUMENTS

| | | | |
|---|---|---|---|
| 4,435,707 | 3/1984 | Clark | 342/26 |
| 4,493,647 | 1/1985 | Cowdrey | 434/2 |
| 4,950,075 | 8/1990 | Ichinose et al. | 356/141 |
| 5,027,122 | 6/1991 | Wieler | 342/26 |
| 5,047,775 | 9/1991 | Alitz | 342/26 |
| 5,075,856 | 12/1991 | Kneizys et al. | 364/420 |
| 5,130,712 | 7/1992 | Rubin et al. | 342/26 |
| 5,265,024 | 11/1993 | Crabill et al. | 364/443 |
| 5,315,513 | 5/1994 | Abreu et al. | 364/420 |
| 5,359,330 | 10/1994 | Rubin et al. | 342/26 |
| 5,481,270 | 1/1996 | Urkowitz et al. | 342/101 |
| 5,488,375 | 1/1996 | Michie | 342/26 |
| 5,546,084 | 8/1996 | Hindman | 342/25 |
| 5,675,081 | 10/1997 | Solheim et al. | 73/170.28 |
| 5,751,289 | 5/1998 | Myers | 345/419 |
| 5,845,874 | 12/1998 | Beasley | 244/1 R |
| 5,884,226 | 3/1999 | Anderson et al. | 702/3 |

OTHER PUBLICATIONS

A.L. Pazmany et al. "An Airborne 95GHz Dual–polorized Radar for Cloud Studies", IEEE Trans. Geosci. Remote Sensing, vol. 32, No. 4, pp. 731–739, (Jul. 1994).

Liebe, "An updated model for millimeter wave propagation in moist air", Radio Sci., vol. 20, No. 5, pp. 1069–1088 (1985).

Cannon, P.S., "Ionospheric models and measurements required by HF communication system designers and operators", IEEE Coll. on propagation characteristics and related system techniques for beyond line of sight radio, ref. No. 1997/390, pp. 1/1–1/4, 1997.

Beaver, J.D. et al, "The application of S–band polarimetric radar measurements to Ka–band attenuation prediction", Proceedings of the IEEE, vol. 85 6, pp. 893–909, Jun. '97.

Wieler, J.G. et al, "Elimination of dopller ambiguities in weather radar data", Record of the 1993 IEEE Nat'l Radar Conference, pp. 163–166, 1993.

*Primary Examiner*—John B. Sotomayor

[57] ABSTRACT

A radar system and method for observing weather phenomena which sets a weather model corresponding to weather conditions, determines the attenuation of a radio wave due to the atmosphere and particles based on the weather model, calculates a radar range using the attenuation of the radio wave, and determines radar system parameters based on the radar range.

20 Claims, 6 Drawing Sheets

FIG. 2(a) setting a weather model
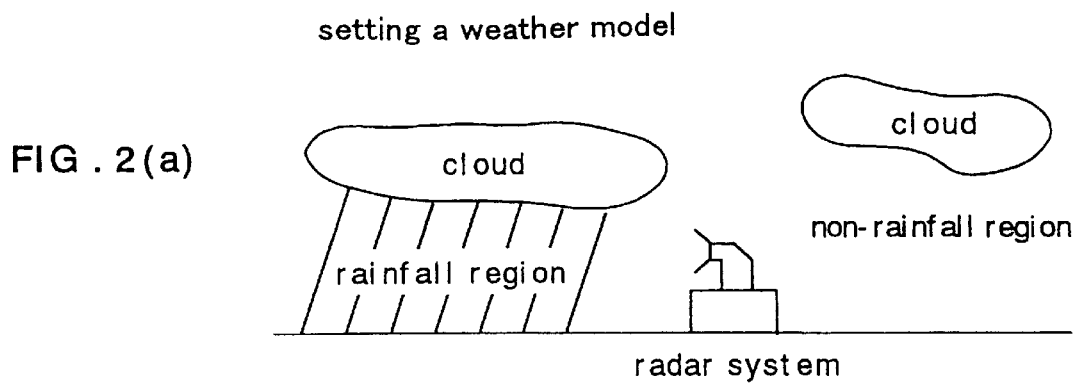
FIG. 2(b) calculation of radar range distribution
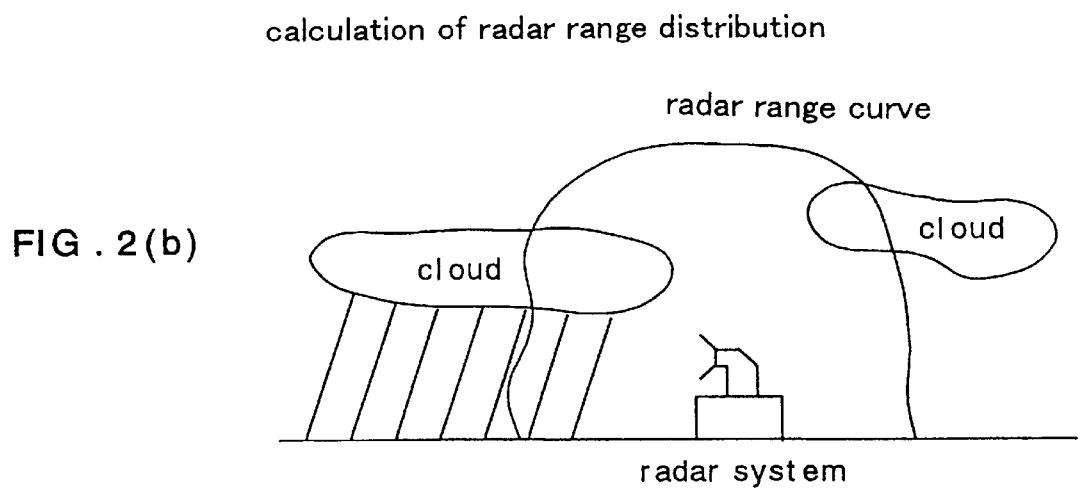
FIG. 2(c) obsevation of rain-fall and clouds by radar system
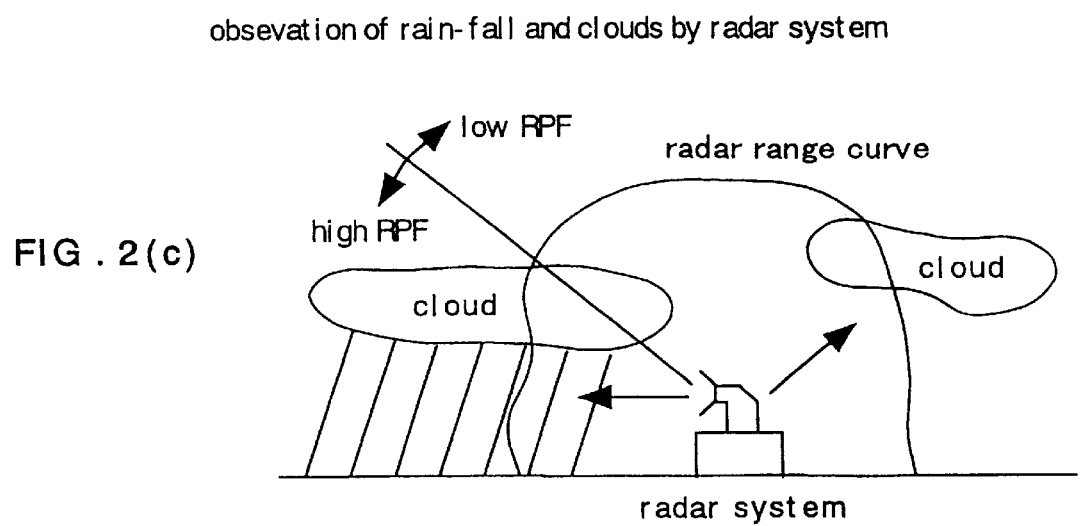

FIG. 4(a) observation of rain-fall by low frequency radar system
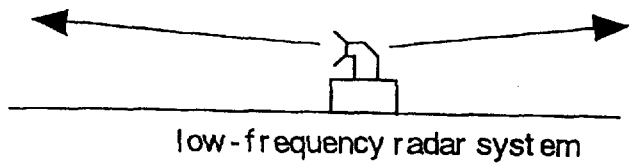
FIG. 4(b) setting of a weather model
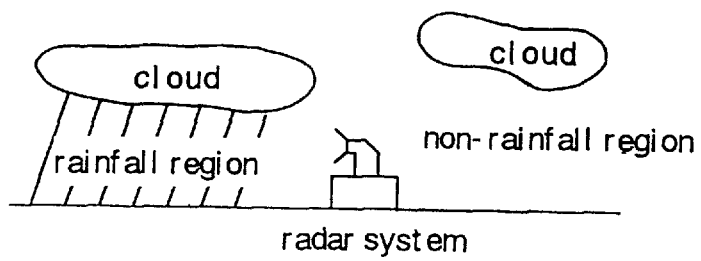
FIG. 4(c) calculation of radar range distribution of high frequency radar system
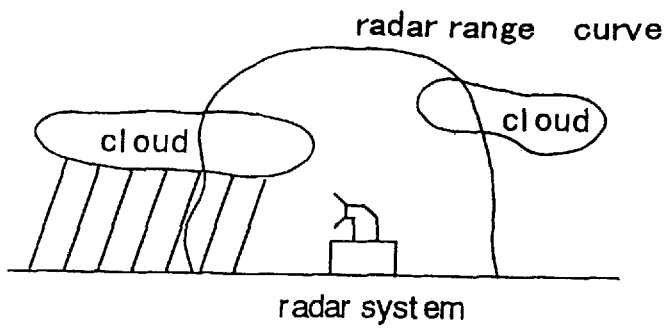
FIG. 4(d) obsevation of rain-fall and clouds by high frequency radar system
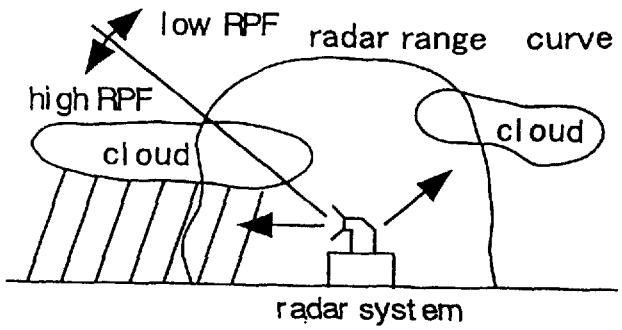

RADAR SYSTEM FOR OBSERVING WEATHER PHENOMENA WITH IMPROVED RADAR SYSTEM PARAMETERS

BACKGROUND OF THE INVENTION

1. Field of the Invention

The present invention relates to a radar system for observing weather phenomena and a radar signal processing method therefor, and particularly relates to a technique for performing a radar range evaluation based on a weather model set corresponding to weather conditions and for optimizing radar system parameters with high efficiency.

2. Background Art

A transmitting frequency of a radar system for observing weather phenomena, which is principally intended for observations of a rainfall region, has heretofore been less than an X band (this system will hereinafter be called a "low-frequency radar system").

However, the use of a radar system having a higher transmitting frequency (hereinafter called a "high-frequency radar system"), which is intended for observations of clouds or fog including particles smaller than rain droplets, has increased in recent years.

A radar system using a millimeter wave whose transmitting wavelength is on the order of millimeter, is able to observe cloud particles and fog particles each being on the order of a several tens of $\mu$m in particle diameter. One such radar system has been disclosed in A. L. Pazmany et al. "An Airborne 95 GHz Dual-polarized Radar for Cloud Studies", IEEE Trans. Geosci. Remote Sensing, vol. 32, no. 4, pp. 731–739, (July. 1994).

Since a radio wave is greatly attenuated due to the atmosphere and rainfall particles as compared with the low-frequency radar when targets such as rainfall or clouds are observed by the high-frequency radar disclosed in the above-described publication, the radar range is reduced.

Since the attenuation or the attenuation factor of the radio wave depends on an existing region of rainfall or clouds and weather conditions such as the amount of water droplets therein, etc., the radar range of the radar system for observing them greatly depends on weather conditions and observing directions. In order to increase or extend the radar range in the observing direction in which the radar range is short because the radio wave is greatly attenuated, a number of integration in the observing direction must be increased. It is also necessary to perform antenna scanning as to be able to obtain an increase in the number of integration in the observing direction. Now consider the method to obtain a Doppler velocity in order to measure the movement of a target such as a cloud or the like. Since the Doppler frequency is proportional to a transmitting frequency, it is necessary to increase a pulse repetition frequency (hereinafter called "PRF") with a view toward setting the maximum Doppler velocity measurable by the high-frequency radar system to a magnitude of a predetermined value or more.

The execution of a coherent radar process, such as the measurement of the Doppler velocity, must obtain a plurality of received pulse signals within a correlation time of a weather echo, and it is known that the correlation time of the weather echo is proportional to inverse of the transmitting frequency. As a result, a high PRF is needed to measure the Doppler velocity by the high-frequency radar system.

Since, however, the increase in PRF causes ambiguity in the distance measurement, a problem arises in that reflected echoes from beyond the maximum observed distance determined according to PRF, i.e., multiple echoes are mixed into a received signal. Since sources of the multiple echoes and radio waves respectively vary in reflectivity and attenuation depending on weather conditions, the influence of the multiple echoes also depends on the weather conditions and the observing direction.

Thus, the decrease in radar range due to the attenuation of the radio wave and the ambiguity in distance measurement vary depending on the weather conditions. However, the conventional radar system for observing the weather phenomena is accompanied by a problem that the radar range evaluation is not performed corresponding to the weather conditions, and hence the radar observations are not always carried out based on the suitable radar system parameters corresponding to the weather conditions.

SUMMARY OF THE INVENTION

With the foregoing problems in view, it is therefore an object of the present invention to provide a radar system for observing weather phenomena, which is capable of optimizing radar system parameters with efficiency corresponding to the weather conditions.

According to one aspect of the present invention, a radar system is provided for transmitting a radio wave from an antenna and receiving the radio wave reflected from a target to thereby observe weather phenomena. The radar system comprises weather model setting means for setting a weather model corresponding to weather conditions. Attenuation factor calculating means determines an attenuation factor of the radio wave due to the atmosphere and particles based on the weather model. The radar range evaluating means calculates a radar range by using the determined attenuation factor of radio wave due to the atmosphere and particles. The radar system parameters determining means decides radar system parameters based on the calculated radar range.

In another aspect of the present invention, the radar system further comprises a low-frequency radar apparatus capable of detecting a long distance (approximately ⅕ to ½ of the maximum range of a radar system). The observation result of the low frequency radar apparatus is fed to the weather model setting means for setting a weather model corresponding to weather conditions.

In another aspect of the present invention, the radar system comprises weather parameter estimating means for estimating weather parameters based on the result of radar observations and feeding the estimated weather parameters to the weather model setting means for setting a weather model corresponding to weather conditions.

In another aspect of the present invention the maximum pulse repetition frequency of the radio wave is set to be free from the ambiguity in distance measurement based on the radar range calculated by the radar range evaluating means.

In another aspect of the present invention, in the radar systems, the observation of the shorter radar range region is conducted with higher pulse repetition frequency of the radio wave.

In another aspect of the present invention, in the radar systems, the beam scanning of the radio wave is made to obtain a larger number of integration in the direction with the shorter radar range.

BRIEF DESCRIPTION OF THE DRAWINGS

Other objects and advantages of the present invention will be more completely understood from the following detailed description, taken in conjunction with the accompanying drawings wherein:

FIGS. 2(a)–2(c) are schematic diagram for describing the operation of the first embodiment of the present invention;

FIGS. 4(a)–4(d) are schematic diagrams for describing the operation of the second embodiment of the present invention;

BEST MODE OF CARRYING OUT THE INVENTION

Preferred embodiments of the present invention will hereinafter be described in detail with reference to the accompanying drawings.

First Embodiment

Figure 1:
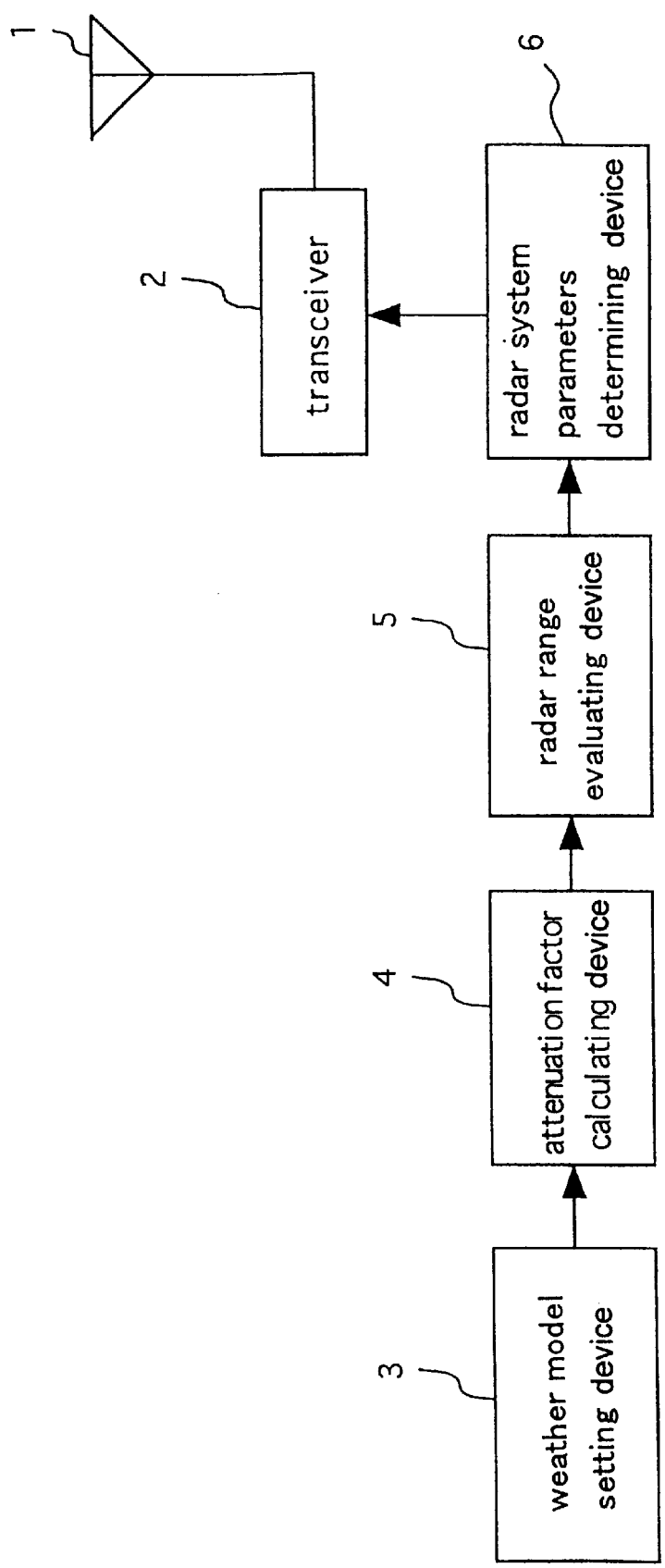
FIG. 1 is a configurational block diagram showing a first embodiment of the present invention.

FIG. 1 is a configurational block diagram showing a first embodiment of the present invention. In the drawing, reference numerals 1, 2, 3, 4, 5 and 6 indicate an antenna, a transmitter-receiver or transceiver, a weather model setting device, an attenuation factor calculating device, a radar range evaluating device, and a radar system parameters determining device (radar-observing items or data), respectively. A radar system having the antenna 1 and the transceiver 2 serves as a high-frequency radar system.

The weather model setting device 3 sets a weather model corresponding to observed weather conditions. When it is desired to observe stratiform clouds, for example, parameters such as a cloud base height, the amount of cloud water droplets, rainfall intensity, temperatures and atmospheric pressure are determined.

In regard to the rainfall intensity, temperatures and atmospheric pressure, these parameters may be determined from the result of observations by a ground-based available observation system. In regard to the cloud base height and the amount of cloud water droplets, these parameters are determined from the type of cloud that exists upon visual observation, whereby typical numerical values are set.

The attenuation factor calculating device 4 calculates an attenuation factor of a radar's radio wave in a rainfall region and a cloud region from the weather model set by the weather model setting device 3.

The attenuation of the radar radio wave results from attenuation produced due to gases such as water vapor, oxygen, etc. and attenuation produced due to particles such as raindroplets, cloud particles or the like. The rate of the attenuation of the radio wave, which is produced due to the gases, can be calculated using the MPM (Millimeter wave Propagation Model) which has been proposed in the publication: Liebe, "An updated model for millimeter wave propagation in moist air", Radio Sci., vol. 20, No. 5, pp. 1069–1088 (1985).

In the attenuation produced due to the particles, a droplet or particle size distribution will first be assumed. For example, a Marshall-Palmer distribution is typified as a rainfall particle size distribution. This particle size distribution may be normally used.

An attenuation cross-section of each particle for each particle size or diameter will next be calculated. When one attempts to strictly calculate the attenuation cross-section, a Mie scattering analysis is executed. However, when the particle is sufficiently larger than the wavelength of the radar radio wave, a Rayleigh scattering analysis may be used. If the product of the particle diameter or size distribution and the attenuation cross-section is made and integrated with the particle diameter, then the attenuation factor based on the particles can be calculated.

The radar range evaluating device 5 performs radar range evaluations in accordance with a weather radar equation through the use of the attenuation factors in the weather model regions, which have been obtained by the attenuation factor calculating device 4.

The radar system parameters determining device 6 determines radar system parameters based on the radar range obtained by the radar range evaluating device 5.

When it is desired to measure a Doppler frequency by a radar system using a millimeter wave, for example, it is considered to be determined from PRF. If the PRF is high, then the resolution of measurement of the Doppler frequency is enhanced. Further, since the measurable maximum Doppler frequency becomes high, the aliasing of the Doppler frequency can be avoided.

However, since the maximum distance to be observed becomes short with the increase in PRF, a multiple echo problem, i.e., a problem about ambiguity in distance measurement arises.

Thus, the maximum PRF is set within a range free from the ambiguity in distance measurement based on the radar range calculated by the radar range evaluating device 5. In other words, PRF may be set at such a maximum value free from the ambiguity in distance measurement.

FIG. 2(a)–2(c) are schematic diagrams for explaining the operation of the first embodiment of the present invention.

FIG. 2(a) is a schematic diagram showing a rainfall region and a non-rainfall region which respectively exist on the left and right sides of the radar system.

FIG. 2(b) is a schematic diagram illustrating, by a radar range curve, the state in which a radar range becomes short because a transmitted radio wave is greatly attenuated when a rainfall region exists in the direction of observation of the radar system.

FIG. 2(c) is a schematic diagram depicting the state in which observation for rainfall region, in which radar range is shortened, is conducted with higher PRF than a non-rainfall region. In this case, the influence of secondary echoes is not arisen even if the PRF is high.

It is also considered that the radar system parameters will be determined under the standard that a radar range is extended in the direction in which the radar range determined by the radar range evaluating device 5 is short. Namely, in the observational direction evaluated as being short in the radar range by the radar range evaluating device 5, the beam scanning is made to obtain number of integration larger than a number of integration first assumed by the radar range evaluating device 5.

When rainfall intensities differ depending on the direction or bearings, for example, the radar system parameters may be set so that the integral number is larger in the bearings where a rainfall is intense.

In the first embodiment of the present invention as described above, the radar range evaluation is performed from the weather model set corresponding to the observed weather conditions, and the radar system parameters can be optimized efficiently.

Second Embodiment

Figure 3:
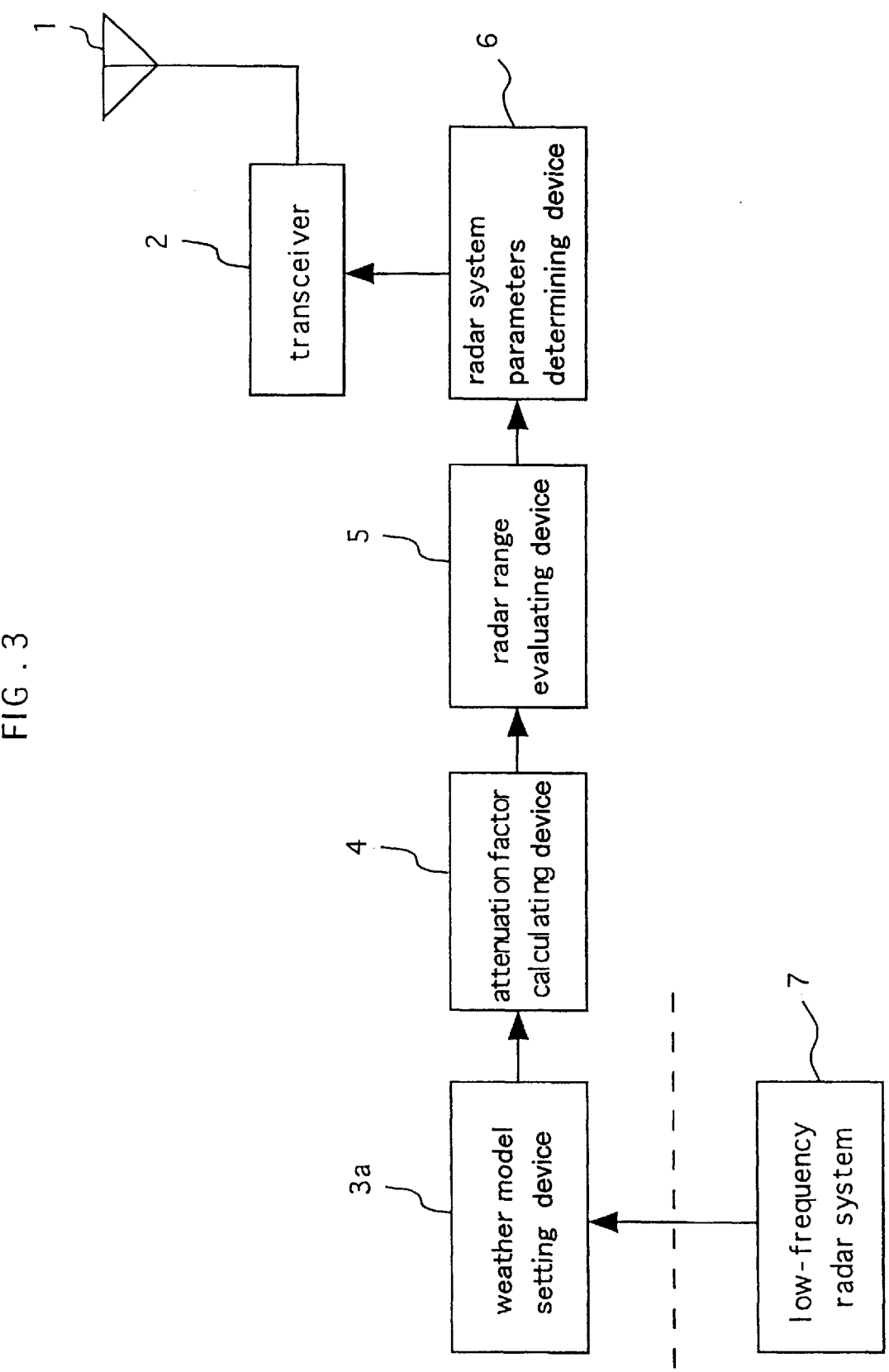
FIG. 3 is a configurational block diagram illustrating a second embodiment of the present invention.

FIG. 3 is a configurational block diagram showing a second embodiment of the present invention. In the drawing, an antenna 1, a transceiver 2, an attenuation factor calculating device 4, a radar range evaluating device 5, and a radar system parameters determining device 6 are identical in configuration to those shown in FIG. 1, which are employed in the first embodiment.

A radar system having the antenna 1 and the transceiver 2 is equivalent to a high-frequency radar system and is assumed to use a Ka band. Reference numeral 3a indicates a weather model setting device, and reference numeral 7 indicates an external low-frequency radar system.

The weather model setting device 3a sets a weather model corresponding to the weather conditions, using the result of observation obtained by a low-frequency radar capable of detecting a distance up to a long distance. The external low-frequency radar system 7 in the present embodiment may be in a C band, for example.

If the low-frequency radar system 7 is placed so that the covered region of the high-frequency radar system is contained within that of the low-frequency radar system 7, then the low-frequency radar system 7 may be set at a same or different position with the high-frequency radar.

FIG. 4 is a schematic diagram for describing the operation of the second embodiment of the present invention.

FIG. 4(a) is a schematic diagram showing the manner in which the low-frequency radar system using the C band cannot observe a cloud region including cloud particles small in particle diameter but is capable of observing even a far region in a rainfall region as compared with the high-frequency radar system using the Ka band.

FIG. 4(b) is a schematic diagram showing a weather model created by the weather model setting device 3a from a rainfall region map acquired from observations made by the low-frequency radar system.

Using the created weather model, the attenuation factor calculating device 4 calculates an attenuation factor in the Ka band.

The radar range evaluating device 5 calculates radar ranges extending in respective observation directions, using the attenuation factor calculated by the attenuation factor calculating device 4.

FIG. 4(c) is a schematic diagram showing, by a radar range curve, the state in which a radar range becomes short because a radio wave to be transmitted is greatly attenuated when a rainfall region exists in the direction of observation by the radar system.

The radar system parameters determining device 6 sets the maximum observing distance free of ambiguity in distance measurement from the radar range calculated from the radar range evaluating device 5. PRF is determined from the maximum observing distance.

FIG. 4(d) is a schematic diagram illustrating the state in which a rainfall region, short in radar range, are being observed with higher PRF than a non-rainfall region. In this case, the influence of secondary echoes is not arisen even if the PRF is high.

In the second embodiment of the present invention as described above, setting of a weather model is made referring to the observation result by a low frequency radar, so that a weather model good in precision over the long distance can be obtained. Thus, the evaluation of a radar range is improved in accuracy. As a result, the radar system parameters can be determined more suitably.

Even when a rainfall region large in reflectivity exists in a long-distant position, the low-frequency radar system can easily detect it as compared with the high-frequency radar system. It is therefore possible to accurately evaluate the influence of secondary echoes resultant from this rainfall region.

Third Embodiment

Figure 5:
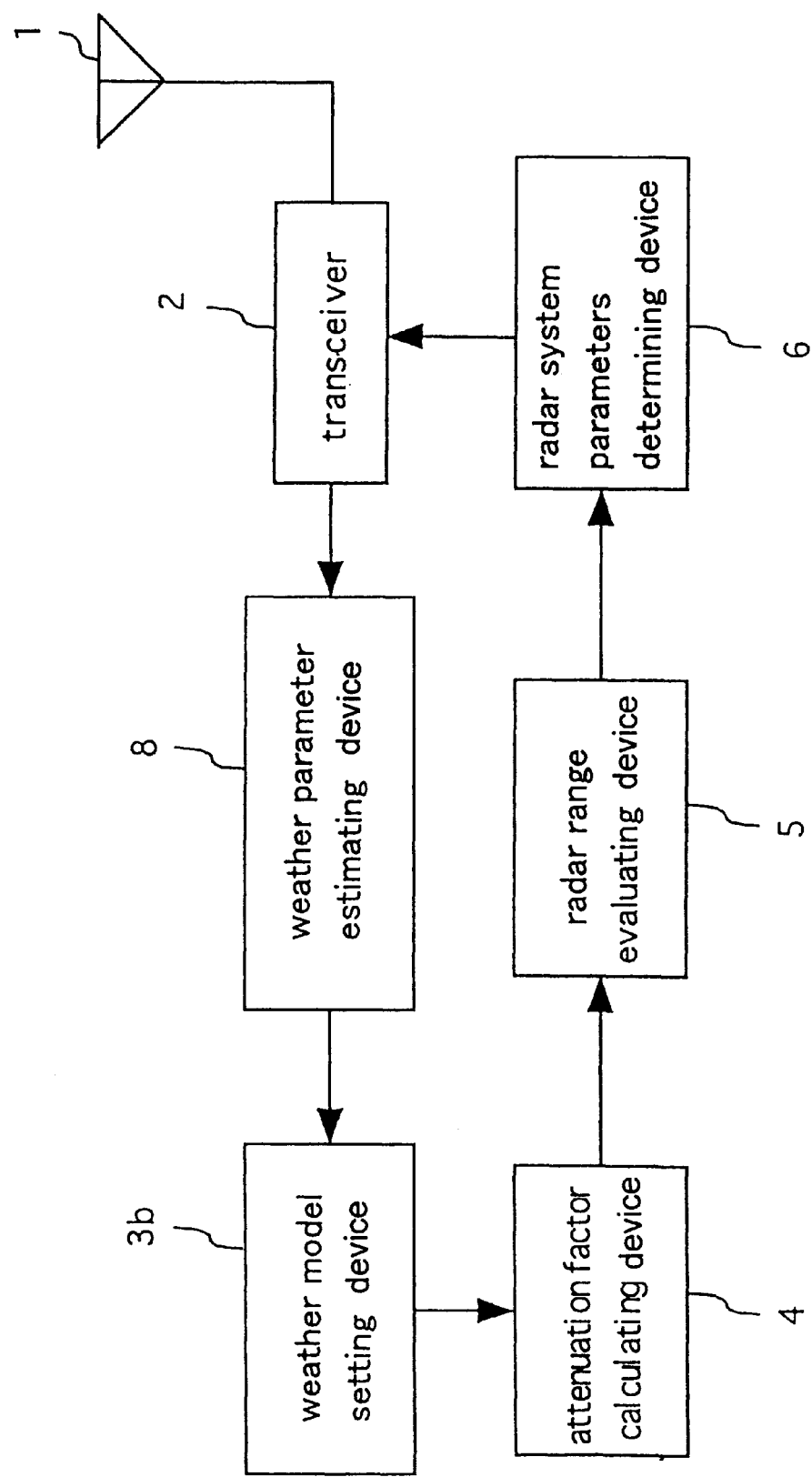
FIG. 5 is a configurational block diagram depicting a third embodiment of the present invention.

FIG. 5 is a configurational block diagram showing a third embodiment of the present invention. In the drawing, an antenna 1, a transceiver 2, an attenuation factor calculating device 4, a radar range evaluating device 5, and a radar system parameters determining device 6 are identical in configuration to those shown in FIG. 1, which are employed in the first embodiment.

Reference numeral 3b indicates a weather model setting device, and reference numeral 8 indicates a weather parameter estimating device.

The weather parameter estimating device 8 estimates weather parameters such as a rainfall intensity, the amount of cloud water droplets, etc. in an observation region from the result of radar observations using the radar system parameters determined from a weather model set corresponding to weather conditions, and outputs these weather parameters to the weather model setting device 3b.

The weather model setting device 3b sets a weather model corresponding to the weather conditions, using the weather parameters estimated by the weather parameter estimating device 8.

Figure 6:
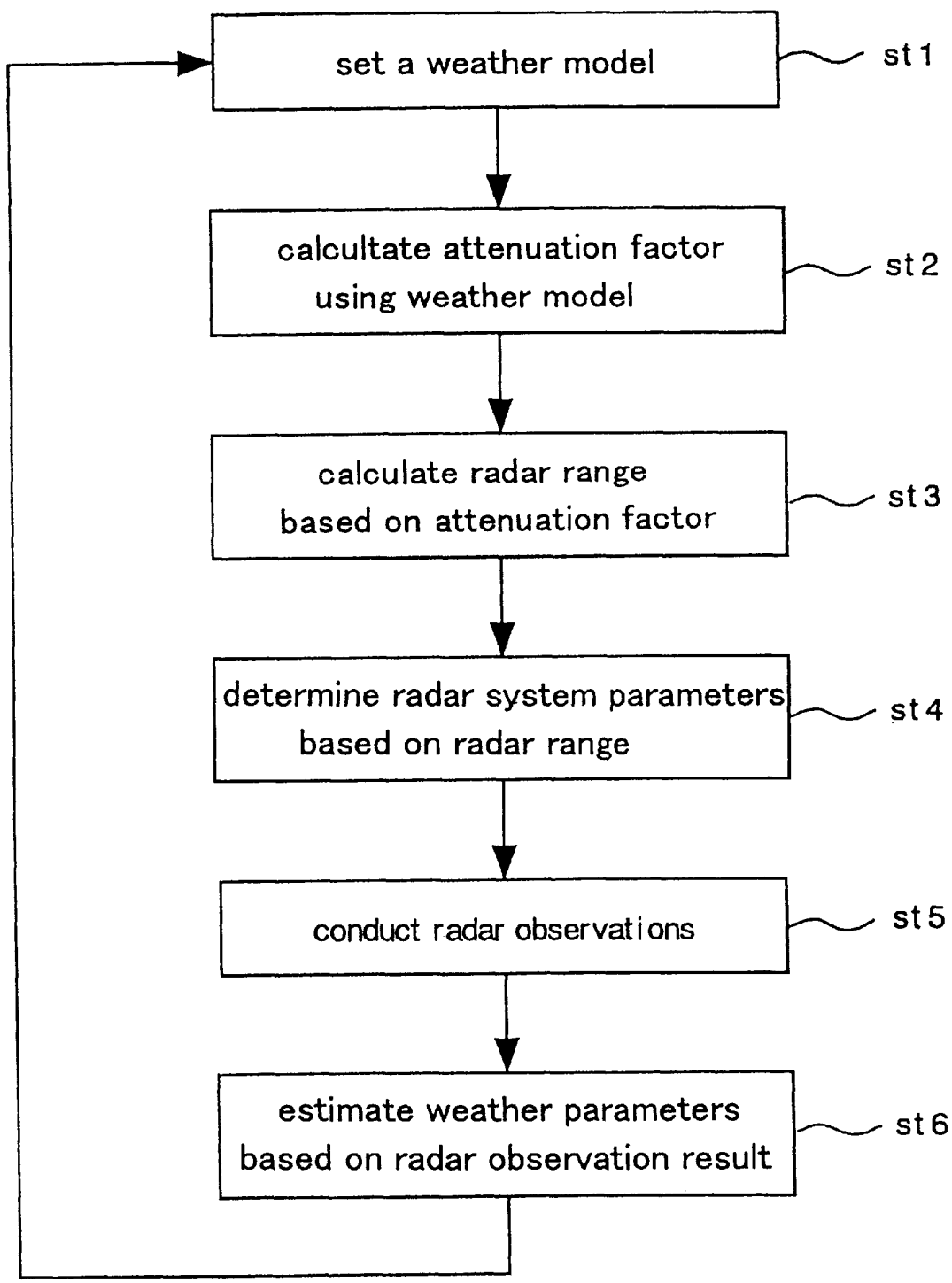
FIG. 6 is a flowchart for explaining the operation of the third embodiment shown in FIG. 5.

FIG. 6 is a flowchart for describing the operation of the third embodiment shown in FIG. 5.

In Step 1, a weather model is set corresponding to the weather conditions at the time of the observation. In Step 2, the attenuation of a radio wave or an attenuation factor thereof due to the atmosphere and particles is determined from the weather model. In Step 3, the radar range is calculated using the determined attenuation factor of radio wave.

In Step 4, the radar system parameters is determined from the radar range. In Step 5, radar observations are carried out using the determined radar system parameters. In Step 6, weather parameters are estimated from the result of the radar observations. A routine procedure is returned to Step 1 to set the weather model using the estimated weather parameters.

In the third embodiment of the present invention as described above, the weather model good in accuracy can be set using the weather parameters estimated from the information obtained from the radar observations. Thus, the accuracy of evaluation for the radar range is enhanced without great expansion of the radar system. As a result, the radar system parameters can be more suitably determined.

The effects and advantages of the present invention may be summarized as follows.

According to the present invention, as has been described above, a radar system can be obtained which is capable of performing a radar range evaluation from a weather model set corresponding to weather conditions to thereby optimize radar system parameters efficiently.

According to the present invention as well, when a weather model is set corresponding to weather conditions, the weather model good in accuracy over a long distance can be set by using the result of observations by a low-frequency radar, whereby the accuracy of a radar range evaluation is enhanced. Thus, a radar system capable of more suitably determining radar system parameters can be obtained.

Further, according to the present invention, when a weather model is set corresponding to weather conditions, the weather model good in accuracy can be set using weather parameters estimated from information obtained from radar observations to thereby enhance the accuracy of a radar range evaluation without great expansion of a radar system. Thus, a radar system capable of more suitably determining radar system parameters can be obtained. Also, a radar signal processing method capable of more suitably determining radar system parameters can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radar system for transmitting a radio wave from an antenna and receiving the radio wave reflected from a target to thereby observe weather phenomena, comprising:

weather model setting means for setting a weather model corresponding to weather conditions;

attenuation factor calculating means for determining an attenuation factor of the radio wave due to the atmosphere and particles based on said weather model;

radar range evaluating means for calculating a radar range by using said attenuation factor; and radar system parameters determining means for determining radar system parameters based on said radar range.

2. The radar system according to claim 1, wherein the radar range calculated by said radar range evaluating means is further used to set a maximum pulse repetition frequency of said radio wave so that the radio wave is free from ambiguity.

3. The radar system according to claim 1, wherein a pulse repetition frequency of said radio wave is inversely proportional to the radar range.

4. The radar system according to claim 1, wherein the beam scanning of said radio wave requires higher integration in a direction with a shorter radar range.

5. The radar system according to claim 1, further comprising a low-frequency radar apparatus capable of detecting a long distance, wherein an observation result of said low frequency radar apparatus is fed to said weather model setting means for setting the weather model.

6. The radar system according to claim 5, wherein a maximum pulse repetition frequency of said radio wave is set to be free from an ambiguity in distance measurement based on the radar range calculated by said radar range evaluating means.

7. The radar system according to claim 5, wherein an observation of a shorter radar range region is conducted with higher pulse repetition frequency of said radio wave.

8. The radar system according to claim 5, wherein the beam scanning of said radio wave is made to obtain a larger number of integration in a direction with a shorter radar range.

9. The radar system according to claim 1, further comprising weather parameter estimating means for estimating weather parameters based on a result of radar observations and feeding said weather parameters to said weather model setting means for setting the weather model.

10. The radar system according to claim 1, wherein a maximum pulse repetition frequency of said radio wave is set to be free from an ambiguity in distance measurement based on the radar range calculated by said radar range evaluating means.

11. The radar system according to claim 1, wherein an observation of a shorter radar range region is conducted with higher pulse repetition frequency of said radio wave.

12. The radar system according to claim 1, wherein beam scanning of said radio wave is made to obtain a larger number of integration in a direction with a shorter radar range.

13. A radar signal processing method comprising the steps of:

setting a weather model corresponding to weather conditions;

calculating an attenuation factor for determining an attenuation of a radio wave due to the atmosphere and particles based on said weather model;

calculating a radar range using the attenuation;

deciding radar system parameters based on said radar range;

performing radar observations based on said radar system parameters;

estimating weather parameters based on a result of said radar observations; and modifying said weather model using said estimated weather parameters.

14. The method according to claim 13, wherein a maximum pulse repetition frequency of the radio wave is set to be free from an ambiguity in distance measurement based on the calculated radar range.

15. The method according to claim 13, wherein an observation of a shorter radar range region is conducted with higher pulse repetition frequency of the radio wave.

16. The method according to claim 13, wherein beam scanning of the radio wave is made to obtain a larger number of integration in a direction with a shorter radar range.

17. A method for transmitting a radio wave from an antenna and receiving the radio wave reflected from a target to thereby observe weather phenomena, comprising:

setting a weather model corresponding to weather conditions;

determining an attenuation factor of the radio wave due to the atmosphere and particles based on the weather model;

calculating a radar range by using the attenuation factor; and determining radar system parameters based on said radar range.

18. The method according to claim 17, wherein maximum pulse repetition frequency of the radio wave is set to be free from an ambiguity in distance measurement based on the reduced radar range calculated by said radar range evaluating means.

19. The method according to claim 17, wherein an observation of a shorter radar range region is conducted with higher pulse repetition frequency of said radio wave.

20. The method according to claim 17, wherein the beam scanning of the radio wave is made to obtain a larger number of integration in a direction with a shorter radar range.

* * * * *